(No Model.)

C. H. LAND.
ARTIFICIAL TOOTH.

No. 432,737.   Patented July 22, 1890.

Witnesses
John Schuman
Charles F. Salow

Inventor
Charles H. Land
By his Attorney
Newell S. Wright

UNITED STATES PATENT OFFICE.

CHARLES H. LAND, OF DETROIT, MICHIGAN.

ARTIFICIAL TOOTH.

SPECIFICATION forming part of Letters Patent No. 432,737, dated July 22, 1890.

Application filed December 30, 1889. Serial No. 335,441. (No model.)

*To all whom it may concern:*

Be it known that I, CHARLES H. LAND, a citizen of the United States, residing at Detroit, county of Wayne, State of Michigan, have invented certain new and useful Improvements in Artificial Dentures; and I declare the following to be a full, clear, and exact description of the invention, such as will enable others skilled in the art to which it appertains to make and use the same, reference being had to the accompanying drawings, which form a part of this specification.

My invention relates to certain new and useful improvements in artificial dentures, having in view a novel article of manufacture and a novel process of applying the same, all as more fully hereinafter described and claimed, and more particularly illustrated in the accompanying drawings, in which—

Figure 1:
Figure 2:
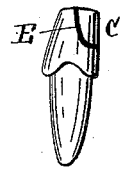
Figure 3:
Figure 4:
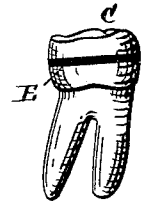
Figure 5:
Figure 6:
Figure 7:
Figure 8:
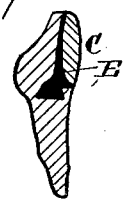
Figure 9:
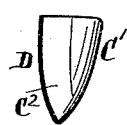
Figure 10:
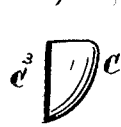
Figure 11:
Figure 12:
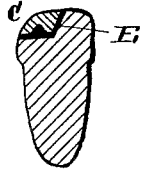
Figure 13:
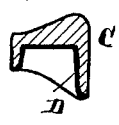
Figure 14:
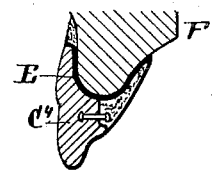

Figure 1 is a side elevation showing a defective tooth. Fig. 2 is a similar view of a tooth repaired. Fig. 3 is a separate view of my improved section, showing the biscuit-surface. Fig. 4 is a modification where a crown is applied to the tooth. Fig. 5 is a view of the matrix. Fig. 6 is a separate view of a section having a metal surface. Fig. 7 shows a crown with a metal surface. Fig. 8 is a modification. Fig. 9 shows a veneer-built-up tooth porcelain body. Fig. 10 shows a section having a porous face. Figs. 11, 12, and 13 illustrate modifications. Fig. 14 shows a gum-section united to a base.

In the course of many experiments and investigations in operative dentistry, which have led me to various improvements in the art heretofore, I have come to the further improvements herein set forth, some features of which are based upon patents of this class already granted to me, and particularly include certain matters embodied in United States Letters Patent, dated December 20, 1887, No. 375,167, relating to the construction and use of a matrix constituting a mold corresponding to the cavity or lost portion of a tooth to be restored or repaired, and by means of which a tooth-section can be made of any suitable material conforming to said cavity or lost portion of the tooth.

In a further application for United States Letters Patent now pending—viz., Serial No. 312,029, filed May 25, 1889, for an improved process of restoring defective teeth—I contemplate the use of amalgam as a means for securing certain tooth sections or plugs in place in or upon the tooth repaired. It is well known that the compound commonly called "amalgam," being a composite of mercury and other metals, has a peculiar affinity for gold and silver and readily unites therewith. As set forth in said application, amalgam is therefore therein set forth as a desirable means for attaching a metal section or plug to a tooth. My present invention contemplates in addition the use of amalgam as a means of attaching any other desired tooth-section to a tooth and the novel construction of a tooth-section to be thus united.

I carry out my invention as follows:

A represents a tooth-cavity or lost portion of a tooth to be filled or built up, as the case may be. The tooth being properly prepared in the usual manner, I burnish or swage thereupon a piece of platinum foil, as in my patent above referred to, to form a matrix or mold. The foil may be conformed either to a cavity or to the surface of a decayed or defective tooth, and either for the formation of a filling-section or a crown or partial crown, or any other desired tooth-section. By the aid of this matrix I form a tooth-section of desired form and of any desired material. Thus, for example, as set forth in said patent more specifically, I may mold upon said matrix or thereinto porcelain body or paste, which when fused shall constitute the desired section. I would have it distinctly understood, however, that I do not herein limit myself to any specific material solely in the construction of said tooth-sections, as any vitreous or other suitable substance, as porcelain, glass, metal, and anything else found suited to the purpose, may be employed within the scope of my invention. Accordingly, B denotes the matrix, and C an artificial tooth-section of any required form and material. Upon the sections so constructed I fuse a coating of gold, as at D. In order to make the gold adhere to the tooth-section, my invention contemplates, as one of its features, a more definite construction also of said section, although I do not limit myself exclusively thereto.

Instead of building up the entire artificial tooth-section from the matrix as a mold by the use of plastic or molten material, I design, wherever desired, to select a suitable artificial veneer, which may constitute a crown, a partial crown, or other section. A lining of porcelain body may then be employed to conform the veneer to the matrix, said body being applied between the veneer and the matrix and fused upon the veneer. The veneer will ordinarily have a glazed surface, upon which a coating of gold is not so readily attached; but it will be evident that the porcelain body fused thereto will be, when completed, in the nature of what is called a "biscuit," and of a more porous nature than the glazed portion, and upon this unglazed surface the gold may be very readily fused. Accordingly, as illustrated more particularly in Fig. 9, C' denotes such a veneer; C$^2$, the coating or lining of porcelain body or paste fused thereupon and upon which, as at D, the gold is fused. So, also, instead of selecting a veneer of any desired form, the tooth-section may be built up in a desired manner and of desired form, the same being fused and glazed to constitute the tooth-section, after which a suitable coating of the porcelain paste C$^3$ may be applied to the required surface, the section being again subjected to the furnace to fuse the applied coating of paste to a biscuit, the gold being thereafter fused thereupon. The gold may, however, be applied to the section in any desired manner.

An artificial section having gold fused thereupon may constitute an article of manufacture and be furnished to dentists of any required form suited for all varieties of needs, as fillings, crowns, partial crowns, and the like, ready for use, or which may be readily adapted for use as occasion arises. A section so made is applied to the tooth by means of amalgam, which will, as already described, readily unite with the gold and firmly and securely hold the section in place. By this means the use of ordinary cements is avoided, and which, owing to the well-known liability of said cements to be dissolved and washed out by the action of the fluids of the mouth, becomes a matter of greatest importance, as the amalgam is not exposed to any such liability, but is durable and permanent. The amalgam union is indicated at E.

It will be obvious from the foregoing that a solution of gold worked into and over a porous surface, as described, would become more thoroughly united therewith than if the tooth-section had simply a glazed surface, adding in a large measure a mechanical attachment. Any vitreous substance may readily be so used in the formation of a tooth-section by providing the same with a "biscuited" surface. I have discovered that a gold solution, such as is used in the ordinary decoration of china-ware, will adhere in a measure to glazed surfaces, as of glass, for example. However, my improvements go still further by adding, preferably, to the glazed surface a semi-vitreous or biscuit surface, or, technically speaking, a porous surface, as is well known in the usual biscuit-ware turned out by porcelain manufacturers, thereby providing a more complete method of attaching the metal.

I would have it understood that in many cases the tooth-cavity or lost portion may be built up as desired with amalgam before uniting the tooth-section thereto. So, also, the tooth-section, constructed with a porcelain exterior and metal facing, may itself be further built up to larger proportions, or further faced by amalgam E' before application to the tooth, the amalgam to be further used to set the tooth-section in place, uniting with the amalgam face of the tooth-section in this instance in like manner, as already described. So, also, a solid section or plug of gold with amalgam attached may be used; or a gold post D', attached to the section or analogous attaching device, may have amalgam united therewith or be united thereby. A metal pin or analogous device may likewise in the same manner be amalgamated upon a tooth-section, or the fastening be so amalgamated into a root of a tooth. Fastenings of gold, silver, copper, or aluminum bronze, or any suitable metal may be employed. Being able to dispense with heat, metals of lower grades, which are very much cheaper, may be employed, and which in many instances are very much stronger. Where a metal has an affinity for amalgam, no further preparation thereof is required in order to effect an amalgam union of the same in place. Where the metal employed for the fastening has no affinity for amalgam, it may be coated with gold. Instead of coating the tooth-sections with gold, however, they may be coated with tin or any other metal having an affinity for amalgam. What are known as "inlays" "cavity-stoppers," "crowns," "veneers," or "facings," including "cusp-crowns" or "partial crowns," may thus be put upon the market as articles of manufacture, having one or more of their surfaces coated with metal ready to be amalgamated into place. So, also, gum-sections in like manner may be united to a plate with amalgam, in place of using the customary pins, and I would have it understood that I contemplate gum-sections in the use of the term "tooth-section" in the following claims. So, also, a tooth-section provided with a gold or metal surface as an article of manufacture might be fastened in place otherwise than by the use of amalgam without departing from the scope of my invention so far set forth as the section as an article of manufacture is concerned—as, for instance, a gum-section so coated would be useful as follows: A cast-metal base could be fitted to the mouth and then the gum-sections soldered to the base with a low grade of solder, such as is reduced to a lower fusing-point by means of bismuth. So, also, the gum-section, with a gold or other suitable metal coat, could be amalgamated to this same class of metallic base. These bases are known in the market as "Watt's metal," and various other titles; or such a section might be amalgamated upon a gold base. Such a construction is shown in Fig. 14, wherein C⁴ is a gum-section and F is a metal base.

What I claim as my invention is—

1. As an article of manufacture, an artificial tooth-section having a metallic surface applied in solution on the proximal surface of the said section and fused thereto, said metallic surface constituting a means for attaching said section, substantially as and in the manner described.

2. As an article of manufacture, an artificial tooth-section provided with a porous or biscuit surface, substantially as set forth.

3. As an article of manufacture, an artificial tooth-section having a porous or biscuit surface provided with metal united with said surface, substantially as set forth.

4. As an article of manufacture, an artificial tooth-section provided with a surface of metal and having amalgam united with said metal surface, substantially as set forth.

5. The process herein described of applying an artificial tooth-section to a base consisting of coating a surface of said section with metal and uniting the section to the base by means of amalgam, substantially as set forth.

6. The process herein described of restoring defective teeth, consisting of first securing an impression of the surface of the tooth portion to be restored by means of a thin sheet of metal fitted upon said surface to form a matrix or mold; second, causing the tooth-section to conform to said mold and hardening said section, and, third, uniting said section to the tooth by means of amalgam, substantially as set forth.

In testimony whereof I sign this specification in the presence of two witnesses.

CHARLES H. LAND.

Witnesses:
N. S. WRIGHT,
CHAS. F. SALOW.